United States Patent
Sampson et al.

(10) Patent No.: US 11,599,748 B2
(45) Date of Patent: Mar. 7, 2023

(54) METHODS AND APPARATUS FOR RECOGNIZING PRODUCE CATEGORY, ORGANIC TYPE, AND BAG TYPE IN AN IMAGE USING A CONCURRENT NEURAL NETWORK MODEL

(71) Applicant: Tiliter Pty Ltd., Sydney (AU)

(72) Inventors: Christopher Bradley Rodney Sampson, Sydney (AU); Sufyan Asghar, Bavaria (DE); Khai Van Do, Sydney (AU); Rui Dong, Sydney (AU)

(73) Assignee: Tiliter Pty Ltd., Sydney (AU)

( * ) Notice: Subject to any disclaimer, the term of this patent is extended or adjusted under 35 U.S.C. 154(b) by 257 days.

(21) Appl. No.: 17/127,088

(22) Filed: Dec. 18, 2020

(65) Prior Publication Data

US 2022/0198218 A1     Jun. 23, 2022

(51) Int. Cl.
| | |
|---|---|
| G06K 9/62 | (2022.01) |
| G06N 3/08 | (2023.01) |
| G06N 3/04 | (2023.01) |
| G06V 20/00 | (2022.01) |
| G06V 20/68 | (2022.01) |

(52) U.S. Cl.
CPC .......... *G06K 9/6256* (2013.01); *G06K 9/628* (2013.01); *G06N 3/04* (2013.01); *G06N 3/08* (2013.01); *G06V 20/00* (2022.01); *G06V 20/68* (2022.01)

(58) Field of Classification Search
None
See application file for complete search history.

(56) References Cited

U.S. PATENT DOCUMENTS

| | | | |
|---|---|---|---|
| 10,332,261 | B1 | 6/2019 | Farivar et al. |
| 2018/0268255 | A1 | 9/2018 | Surazhsky et al. |
| 2019/0213443 | A1* | 7/2019 | Cunningham ........... G06N 3/08 |
| 2020/0034962 | A1* | 1/2020 | Mathew ............... G06V 10/454 |

(Continued)

FOREIGN PATENT DOCUMENTS

RU     2735148 C1     10/2020

OTHER PUBLICATIONS

Kessler, N. et al., "Learning to classify organic and conventional wheat—a machine learning driven approach using the MeltDB 2.0 metabolomics analysis platform," Frontiers in Bioengineering and Biotechnology, vol. 3, Article 35, Mar. 2015, 10 pages.

(Continued)

*Primary Examiner* — Leon Flores
(74) *Attorney, Agent, or Firm* — Cooley LLP

(57) ABSTRACT

In some embodiments, a method can include capturing images of produce. The method can further include generating simulated images of produce based on the images of produce. The method can further include associating each image of produce from the images of produce and each simulated image of produce from the simulated images of produce with a category indicator, an organic type indicator, and a bag type indicator, to generate a training set. The method can further include training a machine leaning model using the training set such that when the machine learning model is executed, the machine learning model receives an image and generates a predicted category indicator of the image, a predicted organic type indicator of the image, and a predicted bag type indicator of the image.

20 Claims, 3 Drawing Sheets

(56) References Cited

U.S. PATENT DOCUMENTS

| | | |
|---|---|---|
| 2020/0356813 A1 | 11/2020 | Sharma et al. |
| 2021/0089845 A1 | 3/2021 | Galeev et al. |
| 2021/0248579 A1* | 8/2021 | Moritz ................ G06Q 20/208 |

OTHER PUBLICATIONS

Sharma, D., "Organic vs conventional food and artificial intelligence," [Online], Retrieved from the Internet: URL: https://medium.com/@devilalsharma/organic-vs-conventional-food-and-artificial-intelligence-18072cd702cd, Aug. 10, 2019, 4 pages.

VinAIResearch, plasticbag-faster-rcnn, "Faster RCNN for plastic bag detection," [Online], Retrieved from the Internet: URL: https://github.com/VinAIResearch/plasticbag-faster-rcnn, 2007, 8 pages.

Gupta, A., et al., "Synthetic data for text localisation in natural images," IEEE Conference on Computer Vision and Pattern Recognition, arXiv:1604.06646v1, Apr. 2016, 14 pages.

International Search Report and Written Opinion for International Application No. PCT/IB2021/062051, dated Mar. 7, 2022, 10 pages.

* cited by examiner

200

```
Generate, at a first compute device, simulated images of produce based on
images of produce 201
```

```
Associate each image of produce and each simulated image of produce with a
category indicator, an organic type indicator, and a bag type indicator, to generate
a training set 202
```

```
Train a machine leaning model using the training set to generate a trained
machine learning model 203
```

```
Transmit the trained machine learning model from the first compute device to a
second compute device that is remote from the first compute device and that
executes the trained machine learning model to generate a predicted category
indicator of an image, a predicted organic type indicator of the image, and a
predicted bag type indicator of the image, upon receipt of the image 204
```

FIG. 2

METHODS AND APPARATUS FOR RECOGNIZING PRODUCE CATEGORY, ORGANIC TYPE, AND BAG TYPE IN AN IMAGE USING A CONCURRENT NEURAL NETWORK MODEL

TECHNICAL FIELD

The present disclosure relates to the field of artificial intelligence, and in particular to apparatus and methods for using a concurrent neural network model to recognize a produce category, an organic type, and a bag type in an image of produce.

BACKGROUND

Recognition of produce can be useful in various industries. For example, recognition of produce can be used in grocery store checkouts, agriculture industry, nutrition studies, storage, customs, security, theft prevention, and/or the like. Known methods for recognition of produce, however, are often performed manually and can be labor-intensive. Thus, a need exists for apparatus and methods for produce recognition.

SUMMARY

In some embodiments, a method includes capturing images of produce (e.g., using a camera). The method further includes generating simulated images of produce based on the images of produce. The method further includes associating each image of produce from the images of produce and each simulated image of produce from the simulated images of produce with a category indicator, an organic type indicator, and a bag type indicator, to generate a training set. The method further includes training a machine leaning model using the training set such that when the machine learning model is executed, the machine learning model receives an image and generates a predicted category indicator of the image, a predicted organic type indicator of the image, and a predicted bag type indicator for the image.

BRIEF DESCRIPTION OF THE DRAWINGS

FIG. 2 is a flowchart showing a method of image recognition, according to an embodiment.

DETAILED DESCRIPTION

Figure 1:
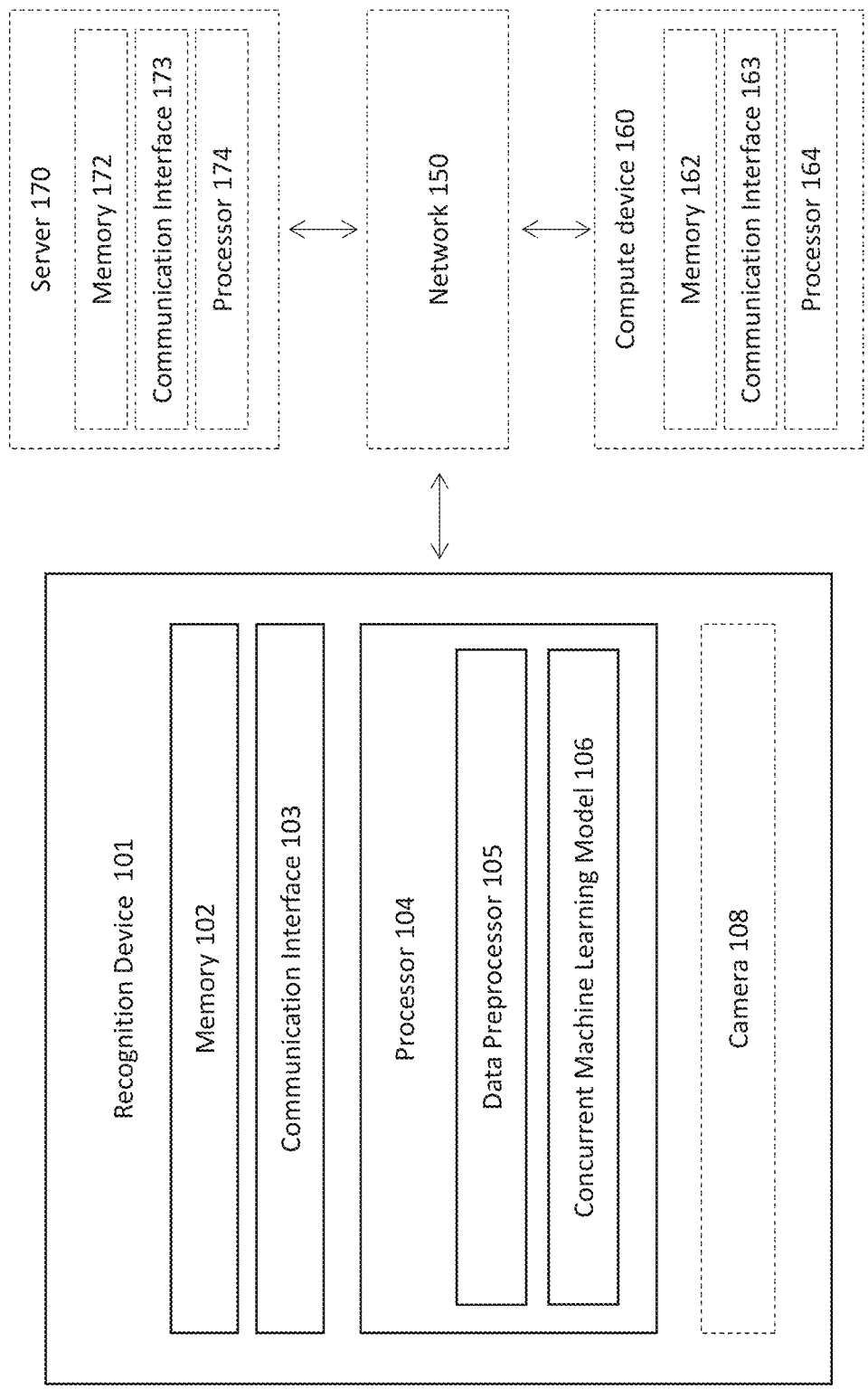
FIG. 1 is a schematic description of a recognition device, according to an embodiment.

Non-limiting examples of various aspects and variations of the embodiments are described herein and illustrated in the accompanying drawings.

Described herein are recognition devices and methods that are suitable for highly reliable recognition of category, bag type, and/or organic type of images of produce. In particular, recognition devices and methods described herein can be implemented in a self-checkout retail device to quickly and efficiently generate a category indicator, a bag type indicator, and/or an organic type indicator for an image of produce. Thereafter, the self-checkout retail device can use the category indicator, the bag type indicator, and/or the organic type indicator of a produce placed to obtain an accurate estimate of weight and cost of the produce.

Recognition of a produce category, a bag type, and/or an organic type of images of produce involves separate image recognitions tasks that can involve analyzing similar images. Each of the separate image recognition tasks can be challenging because the images of produce can have a wide range of variety in color, texture, lighting, marking, bags, background, and/or other factors due to the wide variety in characteristics of types of produce and types of environment in which the images of produce can be taken. Furthermore, training separate models to perform produce category image recognition, bag type image recognition, and/or organic type image recognition on images of produce can add to complexity of performing the separate image recognitions tasks. Moreover, deploying these separate models and applying them for prediction is challenging at a compute device. To mitigate that challenge, recognition devices and methods described herein include concurrent models that can be trained concurrently on data that includes images of various produce categories, images of various bag types, and images of various organic types. Thereafter, the concurrent models described herein can generate a predicted category indicator, a predicted organic type indicator, and a predicted bag type based on an image of produce. Therefore, the recognition devices and methods described herein can use a single concurrent model to performs multiple separate image recognitions tasks. The single concurrent model can, in some instances, (a) be executed faster, (b) reduce memory usage, and/or (c) achieve higher recognition accuracy compared to training and using multiple separate models for each task.

While the methods and apparatus are described herein as processing data from a set of files, a set of images, a set of videos, a set of databases, and/or the like, in some instances a recognition device (e.g., recognition device 101 discussed below in connection with FIG. 1) can be used to generate the set of files, the set of images, the set of videos, a set of text, a set of numbers, and/or the set of databases. Therefore, the recognition device can be used to process and/or generate any collection or stream of data. As an example, the recognition device can process and/or generate any string(s), number(s), image(s), video(s), executable file(s), dataset(s), and/or the like.

FIG. 1 is a schematic description of a recognition device 101, according to an embodiment. The recognition device 101 includes hardware and/or software to perform (or execute) a data preprocessor 105 and/or a concurrent machine learning model 106. The recognition device 101 can receive an image(s) and use the concurrent machine learning model 106 to generate a predicted category indicator of the image, a predicted organic type indicator of the image, and a predicted bag type indicator for the image. Optionally, in some embodiments, the recognition device 101 can be operatively coupled to a compute device 160 and/or a server 170 to transmit and/or receive data (e.g., images of produce, category indicators, organic type indicators, bag type indicators, and/or the like) and/or analytical models (e.g., a copy of the concurrent machine learning model 106) via a network 150. The compute device 160 and the server 170 each can be/include a hardware-based computing device and/or a multimedia device, such as, for example, a server, a workstation, a computer, a desktop, a laptop, a smartphone, a tablet, a wearable compute device, and/or the like.

The recognition device 101 includes a memory 102, a communication interface 103, and a processor 104. In some embodiments, the recognition device 101 can receive data including a set of images, a set of text data, and a set of numerical data, from a data source(s). The data source(s) can be or include, for example, an external hard drive (not shown) operatively coupled to the recognition device 101, the compute device 160, the server 170, and/or the like. In some instances, the recognition device 101 can receive a set of videos from the data source(s) and analyze the set of videos frame by frame to generate the set of images of produce. In some embodiments, the recognition device 101 can optionally include a camera 108 that captures the set of images. In addition, the recognition device 101 can include a set of peripheral devices (e.g., a keyboard, a text-to-speech device, and/or the like; not shown) to record the set of text data or the set of numerical data.

The memory 102 of the recognition device 101 can be, for example, a memory buffer, a random access memory (RAM), a read-only memory (ROM), a hard drive, a flash drive, a secure digital (SD) memory card, an external hard drive, an erasable programmable read-only memory (EPROM), an embedded multi-time programmable (MTP) memory, an embedded multi-media card (eMMC), a universal flash storage (UFS) device, and/or the like. The memory 102 can store, for example, the set of images, the set of text data, the set of numerical data, the model(s), and/or code that includes instructions to cause the processor 104 to perform one or more processes or functions (e.g., a concurrent machine learning model 106).

In some implementations, the memory 102 can store a set of files associated with (e.g., generated by executing) the concurrent machine learning model 106. The set of files associated can include data generated by the concurrent machine learning model 106 during an operation of the recognition device 101. For example, the set of files associated with the concurrent machine learning model 106 can include temporary variables, return memory addresses, variables, a graph of the concurrent machine learning model 106 (e.g., a set of arithmetic operations or a representation of the set of arithmetic operations used by the concurrent machine learning model 106), the graph's metadata, assets (e.g., external files), electronic signatures (e.g., specifying a type of model being exported, and the input/output tensors), and/or the like, generated during the operation of the recognition device 101.

The communication interface 103 of the recognition device 101 can be a hardware component of the recognition device 101 to facilitate data communication between the recognition device 101 and external devices (e.g., the compute device 160, the server 170, peripheral devices, and/or the like) or internal components of the recognition device 101 (e.g., the memory 102, the processor 104, the camera 108). The communication interface 103 is operatively coupled to and used by the processor 104 and/or the memory 102. The communication interface 103 can be, for example, a network interface card (NIC), a Wi-Fi® module, a Bluetooth® module, an optical communication module, and/or any other suitable wired and/or wireless communication interface. The communication interface 103 can be configured to connect the recognition device 101 to the network 150. In some instances, the communication interface 103 can facilitate receiving or transmitting data via the network 150. For example, in some implementations, the communication interface 103 can facilitate receiving or transmitting the set of images at/from the concurrent machine learning model 106, and/or the like through the network 150 from/to the user device 160 or the server 170, each communicatively coupled to the recognition device 101 via the network 150.

The processor 104 can be, for example, a hardware based integrated circuit (IC) or any other suitable processing device configured to run or execute a set of instructions or a set of codes. For example, the processor 104 can include a general purpose processor, a central processing unit (CPU), an accelerated processing unit (APU), an application specific integrated circuit (ASIC), a field programmable gate array (FPGA), a programmable logic array (PLA), a complex programmable logic device (CPLD), a programmable logic controller (PLC), a graphics processing unit (GPU), a neural network processor (NNP), a system on a chip (SOC), a system on a module (SOM), and/or the like. The processor 104 can be operatively coupled to the memory 102 and/or communication interface 103 through a system bus (for example, address bus, data bus, and/or control bus; not shown).

The processor 104 includes the data preprocessor 105 and the concurrent machine learning model 106. Each of the data preprocessor 105 and the concurrent machine learning model 106 can include software stored in the memory 102 and executed by the processor 104. For example, code to cause the concurrent machine learning model 106 to generate a predicted category can be stored in the memory 102 and executed by the processor 104. Alternatively, either or both of the data preprocessor 105 and the concurrent machine learning model 106 can be a hardware-based device. For example, a process to cause concurrent machine learning model 106 to generate a predicted bag type indicator about an image of produce can be implemented on an individual integrated circuit chip.

The data preprocessor 105 can receive and/or fetch data including, for example, the set of images, the set of text data, and/or the set of numerical data, from the data source(s). Thereafter, the data preprocessor 105 can perform statistical analysis and/or data preprocessing the data. In some instances, preprocessing the data can involve normalizing the data to a common scale, a common file format, a common image size, common physical units, and/or the like. Normalizing the data can help the recognition device 101 to analyze the data in an organized and cost-efficient manner. In some instances, preprocessing the data can involve color casting the set of images. For example, in some instances, the images can be converted to a grayscale image. In some instances, preprocessing the data can involve augmenting the data to diversify representations of the data and/or increasing data for training robust machine learning models (e.g., the concurrent machine learning model 106).

The statistical analysis of the data can include calculating a histogram of various categories among the set of images, a histogram various bag types among the set of images, a histogram of various organic types among the set of images. In some instances, the statistical analysis can include fitting statistical distribution based on those histograms. Such statistical analysis can help to determine whether some categories, bag types, and/or organic types are overrepresented or underrepresented in the set of images. When images of a type are overrepresented in the set of images, in some instances, the data preprocessor 105 can reduce the number the images of that type. In contrast, when images of a type are underrepresented in the set of images, in some instances, the data preprocessor 105 can reduce the number the images of other types. In some implementations, overrepresentation and underrepresentation of a type can be determined based on a preset (or predetermined or predefined) threshold. For example, the set of images can include two million images from which more than 90% are images of non-bagged produce. Therefore, the images of non-bagged produce are overrepresented, and the images of bagged produce are underrepresented. Training the concurrent machine learning model 106 based on overrepresented non-bagged produce can result in a biased concurrent machine learning model 106. To reduce or eliminate bias in the concurrent machine learning model 106, in some instances, the data preprocessor 105 can reduce number of images of non-bagged produce to be 40% to 60% of the set of images.

The data preprocessor 105 can generate a set of simulated images (can be also referred to herein as 'synthetic images') to augment the data to diversify representations of the data and/or to increase number of data for training a more robust concurrent machine learning model 106. In some instances, the data preprocessor 105 can additionally generate a set of simulated numerical data and/or a set of simulated text data to accompany the set of simulated images. For example, an image of an inorganic non-bagged apple can be associated with an organic indicator of '0' representing inorganic produce and a bag type indicator of 'non-bagged' representing non-bagged produce. The image of the inorganic non-bagged apple can be processed by the data preprocessor 105 to generate a simulated image of the inorganic apple in a transparent bag and a simulated text data to indicate that the simulated image is presented in a 'transparent bag'. In some implementations, simulating data can involve executing a software (e.g., stored in the memory 102 and executed by the processor 104) to perform a procedural program (e.g., a code representing a set of instructions) to overlay image of markings to images of produce to generate the set of simulated images. For example, the data preprocessor 105 can use methods and/or devices similar to any of the methods and/or device of the image simulation device described in U.S. patent application Ser. No. 17/127,097, entitled "Methods and Apparatus for Automatically Simulating Realistic Synthetic Produce Images with Organic or Other Markings" which is incorporated herein in its entirety by this reference. In some implementations, simulating data can include using a machine learning model to generate images of bagged produce from images of non-bagged produce. For example, the data preprocessor 105 can use models similar to any of the machine learning models of the produce classification device described in U.S. patent application Ser. No. 17/085,585, entitled "Methods and Apparatus for Training a Classification Model Based on Images of Non-bagged Produce or Images of Bagged Produce Generated by a Generative Model" and filed on Oct. 30, 2020, which is incorporated herein in its entirety by this reference.

The data preprocessor 105 generates data for training machine learning model 105 (also referred to herein as "a training set," which can optionally include a validation set and/or a test set) based on the data received by data preprocessor 105. Generating the training set can involve associating each image of produce from the set of images and each simulated image of produce from the set of simulated images of produce with a category indicator from category indicators, an organic type indicator from organic type indicators, and a bag type indicator from bag type indicators, to generate a training set. The category indicator can include, for example, numerical data and/or text data indicating categories of produce. In one example, an image of a carrot can be associated with an alphanumerical string 'CAR2020812' representing carrots 'CAR' produced by an associate farmer number '812' in year '2020'. In another example, an image of a watermelon can be associated with a text data 'watermelon'. The organic type indicator can include, for example, numerical data and/or text data indicating organic type of produce. In one example, the organic type indicator can be a Boolean variable with '0' representing inorganic produce and '1' representing organic produce. The bag type indicator can include, for example, numerical data and/or text data indicating bag type for an image of produce. The bag type indicator can include a transparent bag indicator, a net bag indicator, a colored bag indicator, or non-bagged indicator. In one example, the bag type indicator can include an integer number (e.g., 1, 2, 3, etc.) indicating type of bags (e.g., transparent bag, paper bag, net, etc.) used in the image of produce.

The concurrent machine learning model 106 can receive the training set and be iteratively executed to perform a set of arithmetic and/or logical procedures (e.g., an addition(s), a multiplication(s), a logarithm operation(s), an exclusive or operation(s), and/or the like) based on model parameters (e.g., weights and/or biases of a neural network) on the set of images and/or the set of simulated images to generate predicted category indicators, predicted organic indicators, and/or predicted bag type indicators. The predicted category indicators, the predicted organic indicators, and/or the predicted bag type indicators can be compared to the category indicators, the organic indicators, and/or the bag type indicators using a loss function. In some instances, the loss function can be configured to calculate regression losses, probabilistic losses, and/or hinge losses. For example, the loss function can calculate a binary cross-entropy loss, a categorical cross-entropy loss, Kullback-Leibler divergence loss, a mean square error loss, a mean squared logarithmic loss, a categorical hinge loss, a hinge loss, and/or the like. The loss function can generate a loss value based on accuracy of the predicted category indicators, the predicted organic indicators, and/or the predicted bag type. Thereafter, the model parameters for performing the arithmetic and/or logical procedures can be tuned based on the loss value. Once the loss value arrives at a threshold accuracy value (e.g., 98%) the concurrent machine learning model 106 can be deemed trained. Once trained, the trained concurrent machine learning model 106 can be configured to receive an image and generates a predicted category indicator of the image, a predicted organic type indicator of the image, and a predicted bag type indicator for the image.

In some implementations, the concurrent machine learning model 106 can be or include an artificial neural network (ANN) model, a deep neural network model, a fully connected neural network model, a convolutional neural network (CNN) model, a generative adversarial network (GAN) model, a K-Nearest Neighbors (KNN) model, a Support Vector Machine (SVM), a decision tree, and/or the like.

In some implementations, the recognition device 101 can optionally transmit (e.g., after training) the concurrent machine learning model 106 to the compute device 160 and/or the server device 170.

The compute device 160 can be or include a hardware-based computing device and/or a multimedia device operatively coupled to the recognition device 101 (e.g., through network 150). The compute device 160 can be configured to transmit and/or receive data and/or analytical models to/from the recognition device 101.

In some implementations, the compute device 160 can be, for example, a device at a check-out register of a grocery store that receives from the recognition device 101 and/or the server 170 a copy of the concurrent machine learning model 106, information about the product such as a representation of produce (e.g., being bought at the grocery store), and a representation of weight associated with that produce. The compute device 160 can receive the copy of the concurrent machine learning model 106, the representation of produce and the representation of information about the item, for example, via an application program (API). In some instances, the compute device 160 can receive an image captured by a camera at the check-out lane to generate the representation of the produce and the representation of weight associated to that produce. The compute device 160 can use the concurrent machine learning model 106 to generate a predicted category indicator, a predicted organic type indicator, and a predicted bag type indicator for the representation of the produce. Thereafter, the compute device 160 can use the predicted category indicator, the predicted organic type indicator, and the predicted bag type to adjust the representation of weight associated with the produce and a price of the produce. In some instances, the compute device 160 can optionally process a payment (e.g., using a credit card(s), a bank account transaction(s), a bitcoin(s), and/or the like) based on the price of the produce. To identify and weigh the produce, in some implementations the recognition device 101 can use models similar to any of the models described in U.S. patent application Ser. No. 17/085,582, entitled "Methods and Apparatus for Image Recognition in Mobile Communication Device to Identify and Weight Items" and filed on Oct. 30, 2020, which is incorporated herein in its entirety by this reference.

The server 170 can be/include a compute device medium particularly suitable for data storage purpose and/or data processing purpose and can include, for example, a network of electronic memories, a network of magnetic memories, a server(s), a blade server(s), a storage area network(s), a network attached storage(s), deep learning computing servers, deep learning storage servers, and/or the like. The server 170 can include a memory 172, a communication interface 173 and/or a processor 174 that are structurally and/or functionally similar to the memory 102, the communication interface 103 and/or the processor 104 as shown and described with respect to the recognition device 101. In some implementations, however, the memory 172 can include application specific storage (e.g., deep learning storage servers) that is structurally and/or functionally different from the memory 102. Similarly, in some implementations, the processor 174 can include application-specific processors (e.g., GPU rack servers) that are structurally and/or functionally different from the memory 102.

The network 150 can be a digital telecommunication network of servers and/or compute devices. The servers and/or computes device on the network can be connected via one or more wired and/or wireless communication networks (not shown) to share resources such as, for example, data storage and/or computing power. The wired and/or wireless communication networks between servers and/or compute devices of the network 150 can include one or more communication channels, for example, a radio frequency (RF) communication channel(s), a fiber optic commination channel(s), an electronic communication channel(s), a satellite communication channel(s), and/or the like. The network 150 can be, for example, the Internet, an intranet, a local area network (LAN), a wide area network (WAN), any other suitable communication system, and/or a combination of such networks.

In some implementations, the recognition device 101 can optionally be coupled to a set of peripheral devices (not shown) to receive data and/or commands. The peripheral device can include, for example, a webcam(s), a security camera(s), a mouse(s), a keyboard(s), an external hard drive(s), and/or the like. The recognition device 101 can receive the set of images, the set of text data, and/or the like, or a portion of the set of images, the set of text data, and/or the like from the peripheral devices.

Although the recognition device 101, the compute device 160, and the server 170 are shown and described as singular devices, it should be understood that, in some embodiments, one or more recognition devices, one or more compute device, and/or one or more server devices can be used.

Although the concurrent machine learning model 106 of the recognition device 101 is described to analyze images of produce to generate the category indicators, the bag type indicators, and/or the organic type indicators, it should be understood that, in some implementations, the concurrent machine learning model 106 can generate additional indicators such as for example, genetically modified organism (GMO) indicators, pesticide indicators, grass-fed indicators, cage-free indicators, Kosher indicator, Halal indicator, Vegan indicator, and/or the like.

FIG. 2 is a flowchart showing a method 200 of image recognition, according to an embodiment. In some implementations, a recognition device (such as the recognition device 101 as shown and described with respect to FIG. 1) can be used to perform the method 200. The method 200 can include generating, at 201 and using a first compute device (e.g., the recognition device), simulated images of produce based on images of produce. In some instances, the simulated images of produce can be generated using a procedural program that can overlay images of markings on images of produce, a machine learning model that can translated images of bagged produce to images of non-bagged produce, and/or the like.

At 202, the first compute device can associate each image of produce and each simulated image of produce with a category indicator, an organic type indicator, and a bag type indicator, to generate a training set. In some instances, the training set can include numerous data (e.g., thousands of images, millions of images, billions of images, and/or the like) and can be saved in multiple storage locations/devices (e.g., an internal memory, an external hard drive, a server, and/or the like). The training set can be preprocessed (e.g., using the data preprocessor as shown and described with respect to FIG. 1). In some embodiments, the training set can be divided into batches of data for more efficient training.

At 203, the first compute device can train a machine leaning model using the training set to generate a trained machine learning model. The first compute device can optionally determine a population density for the training set before the training to reduce bias in the trained machine learning model. The population density (e.g., a histogram) can indicate a percentage value for each category represented in the training set, a percentage value for organic produce, a percentage value for inorganic produce, a percentage value for each bag type represented in the training set, and/or the like. In some implementations, the population density of each of the organic produce, or non-bagged produce is selected to be at least 40%.

At 204, the first compute device can transmit the trained machine learning model from the first compute device to a second compute device that is remote from the first compute device and that executes the trained machine learning model to generate a predicted category indicator of an image, a predicted organic type indicator of the image, and a predicted bag type indicator of the image, upon receipt of the image. In some implementations, the first compute device executes the trained machine learning model locally to generate the predicted category indicator of the image, the predicted organic type indicator of the image, and the predicted bag type indicator of the image, upon receipt of the image (e.g., from a camera, the second compute device, a server, and/or the like).

In some embodiments, the method 200 can optionally include detecting an error in the predicted category indicator of the image, the predicted organic type indicator of the image, or the predicted bag type indicator of the image. For example, in some instances, the error can be detected and reported by a user of the first compute device and/or the second compute device. The first compute device and/or the second compute device can be configured to receive a corrected category indicator, a corrected organic type indicator, and/or a corrected bag type indicator. The first compute device and/or the second compute device can further train and refine the trained machine learning model at least based on the image, the error in the predicted category indicator, the predicted organic type indicator, and/or the predicted bag type indicator, the corrected category indicator, the corrected organic type indicator, and/or the corrected bag type indicator.

In some implementations, the method 200 can also include executing an image recognition model to read an indication of information about the produce such as the weight from the image and generate a representation of information about the produce such as the weight. The image recognition model can be a neural network model that can receive an image with a first portion and a second portion. For example, the image can show a produce at the first portion and a scale displaying weight of the produce at the second portion. The image recognition model can use the second portion to generate the indication of weight from the image. The first compute device and/or the second compute device can then calculate an adjusted weight (e.g., the weight of the produce minus the weight of the bag) based on the representation of weight and the predicted bag type indicator. In some instances, the first compute device and/or the second compute device can calculate a price based on the adjusted weight, the predicted category indicator of the image, and/or the predicted organic type indicator of the image. In some instances, the price can be displayed to a user of the first compute device and/or the second compute device. In some instances, the first compute device and/or the second compute device can process a payment (e.g., using a credit card(s), a bank account transaction(s), and/or the like) based on the price.

Figure 3:
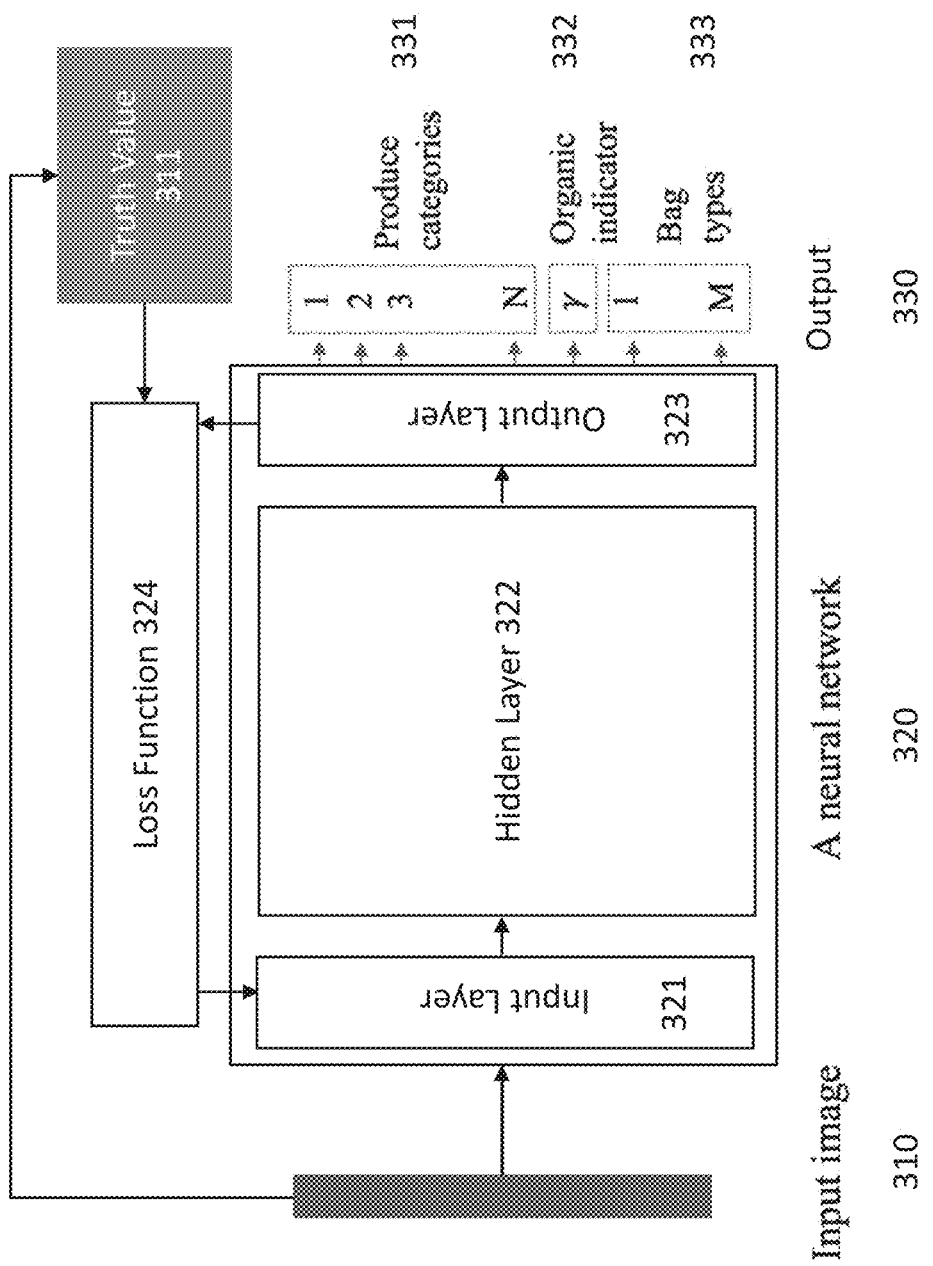
FIG. 3 is a schematic description showing a concurrent neural network model for performing image recognition on an image of produce, according to an embodiment.

FIG. 3 is a schematic description showing a concurrent neural network model for performing image recognition on an image of produce, according to an embodiment. The concurrent neural network model 320 (also referred to as 'neural network') can include an input layer 321, a set of hidden layers 322 (e.g., 5 layers, 10 layers, 20 layers, 50 layers, 100 layers, 200 layers, etc.), and an output layer 323. The input layer 321 can receive an input image 310 as a vector representation of the image. The set of hidden layers can include normalization layers, fully connected layers, convolutional layers, activation layers, dropout layers, and/or any other layers (not shown) that are suitable for image recognition. The output layer 323 can generate an output vector 330 that includes multiple pieces of information about the input image 310. In some instances, the output layer 323 can have a number of neurons Y that includes a first number of neurons N for a number of category indicators 331, a second number of neurons M for a number of bag type indicators 333, and a third number of neurons γ for a number of organic type indicators 332. Similarly, the output vector 330 can have N elements for the category indicators 331, M elements for the bag type indicators 333, and γ elements for organic type indicators 332. The number of neurons Y, the first number of neurons N, the second number of neurons M, and the third number of neurons γ are natural numbers. For N, a list of active categories can be pre-determined before concurrent neural network model 320 is trained. For example, if a grocery store stocks three types of produce, apple, pear, and pineapple, then N is set to be three. For M, a list of bag types can be pre-set as specified by a grocery store. For example, if the grocery store uses paper bags and clear plastic bags, then M is set to be two. For γ, the organic type can be set to be either True or False, thus γ can be set to two. For example, the types of organic can be predefined as organic type 1, organic type 2, organic type 3, and inorganic; γ is then set to four. For Y, once the above N, M, and γ, are determined (or predefined), Y can then be set to be the sum of N, M, and γ.

Although the concurrent neural network model is shown and described to generate category indicators 331, bag type indicators 333, and/or organic type indicators 332, it should be understood that, in some embodiments, the concurrent neural network model can be used to generate other indicators such as, for example, genetically modified organism (GMO) indicators, pesticide indicators, grass-fed indicators, cage-free indicators, Kosher indicator, Halal indicator, Vegan indicator, and/or the like. Furthermore, in some configurations, the concurrent neural network can be used to generate a combination of the indicators, which may or may not include the category indicators 331, bag type indicators 333, and/or organic type indicators 332.

The concurrent neural network model can be configured to iteratively receive input images 310 from a set of training data and generate an output vector 330 that includes multiple pieces of information about the input images. Each input image from the set of training data is associated with at least a category indicator from the set of training data, an organic indicator from the set of training data, and a bag type indicator from the set of training data. The hidden layers of the concurrent neural network model include a set of model parameters (e.g., weights, biases, activation functions, etc.) that perform a set of arithmetic and/or logical procedures on the input images 310 based on the set of model parameters, and generate an output. The output can be compared to the category indicator, the organic indicator, and the bag type indicator from the set of training data using a loss function 324 to generate training losses. In some instances, the loss function 324 can compare output layer 323 of the concurrent neural network model 320 to truth value 311 (e.g., truth value 311 of category indicators, truth value 311 of bag type indicators, and/or truth value 311 of organic type indicators). The set of model parameters can be modified in multiple iterations based on the training loss and the loss function 324 can be executed at each iteration until training losses converge to a predetermined training accuracy threshold (e.g. 80%, 95%, 99%, etc.).

In some instances, the loss function 324 can calculate regression losses, probabilistic losses, and/or hinge losses. For example, the loss function 324 can calculate a binary cross-entropy loss, a categorical cross-entropy loss, Kullback-Leibler divergence loss, a mean square error loss, a mean squared logarithmic loss, a categorical hinge loss, a hinge loss, and/or the like. In some instances, the loss function 324 can be a linear combination of a categorical cross-entropy calculated for the first number of neurons N and the second number of neurons M, and a binary cross-entropy for the third number of neurons γ. Similarly, in some instances, a combination of multiple type of activation functions can be used in the concurrent neural network model. For example, the concurrent neural network model can use a sigmoid activation function for a first subset of neurons on the output layer 323 (e.g., a binary organic type indicators 332) and a softmax activation function for a second subset of neurons on the output layer 323 (e.g., a number of category indicators 331).

It should be understood that the disclosed embodiments are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. Thus, it is to be understood that other embodiments can be utilized and functional, logical, operational, organizational, structural and/or topological modifications may be made without departing from the scope of the disclosure. As such, all examples and/or embodiments are deemed to be non-limiting throughout this disclosure.

Some embodiments described herein relate to methods. It should be understood that such methods can be computer implemented methods (e.g., instructions stored in memory and executed on processors). Where methods described above indicate certain events occurring in certain order, the ordering of certain events can be modified. Additionally, certain of the events can be performed repeatedly, concurrently in a parallel process when possible, as well as performed sequentially as described above. Furthermore, certain embodiments can omit one or more described events.

All definitions, as defined and used herein, should be understood to control over dictionary definitions, definitions in documents incorporated by reference, and/or ordinary meanings of the defined terms.

Examples of computer code include, but are not limited to, micro-code or micro-instructions, machine instructions, such as produced by a compiler, code used to produce a web service, and files containing higher-level instructions that are executed by a computer using an interpreter. For example, embodiments can be implemented using Python, Java, JavaScript, C++, and/or other programming languages, packages, and software development tools.

The drawings primarily are for illustrative purposes and are not intended to limit the scope of the subject matter described herein. The drawings are not necessarily to scale; in some instances, various aspects of the subject matter disclosed herein can be shown exaggerated or enlarged in the drawings to facilitate an understanding of different features. In the drawings, like reference characters generally refer to like features (e.g., functionally similar and/or structurally similar elements).

The acts performed as part of a disclosed method(s) can be ordered in any suitable way. Accordingly, embodiments can be constructed in which processes or steps are executed in an order different than illustrated, which can include performing some steps or processes simultaneously, even though shown as sequential acts in illustrative embodiments. Put differently, it is to be understood that such features may not necessarily be limited to a particular order of execution, but rather, any number of threads, processes, services, servers, and/or the like that may execute serially, asynchronously, concurrently, in parallel, simultaneously, synchronously, and/or the like in a manner consistent with the disclosure. As such, some of these features may be mutually contradictory, in that they cannot be simultaneously present in a single embodiment. Similarly, some features are applicable to one aspect of the innovations, and inapplicable to others.

The phrase "and/or," as used herein in the specification and in the embodiments, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements can optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the embodiments, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the embodiments, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of" "Consisting essentially of," when used in the embodiments, shall have its ordinary meaning as used in the field of patent law.

As used herein in the specification and in the embodiments, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements can optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the embodiments, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A non-transitory processor-readable medium storing code representing instructions to be executed by a processor, the code comprising code to cause the processor to:
    capture a plurality of images of produce,
    generate a plurality of simulated images of produce based on the plurality of images of produce;
    associate each image of produce from the plurality of images of produce and each simulated image of produce from the plurality of simulated images of produce with a category indicator from a plurality of category indicators, an organic type indicator from a plurality of organic type indicators, and a bag type indicator from a plurality of bag type indicators, to generate a training set,
    train a machine leaning model using the training set such that when the machine learning model is executed, the machine learning model receives an image and generates a predicted category indicator of the image, a predicted organic type indicator of the image, and a predicted bag type indicator for the image.

2. The non-transitory processor-readable medium of claim 1, wherein the machine learning model is a first machine learning model, the non-transitory processor-readable medium further comprising code to perform at least one of:
    (a) execute a second machine learning model to generate a first plurality of simulated images from the plurality of simulated images, or
    (b) execute a procedural program to generate a second plurality of simulated images from the plurality of simulated images.

3. The non-transitory processor-readable medium of claim 1, wherein the plurality of bag type indicators includes at least one of a transparent bag indicator, a net bag indicator, a colored bag indicator, or a non-bagged indicator.

4. The non-transitory processor-readable medium of claim 1, wherein the machine learning model is a concurrent model including an output layer having a number of neurons Y including a first number of neurons N for the plurality of category indicators, a second number of neurons M for the plurality of bag type indicators, and a third number of neurons γ for the plurality of organic type indicators.

5. The non-transitory processor-readable medium of claim 4, further comprising code to:
    execute a loss function to calculate a loss value based on the category indicator of the image, the organic type indicator of the image, the bag type indicator of the image, the predicted category indicator of the image, the predicted organic type indicator of the image, or the predicted bag type indicator of the image,
    the loss function is a linear combination of a categorical cross-entropy calculated for the first number of neurons N and the second number of neurons M, and a binary cross-entropy for the third number of neurons γ.

6. The non-transitory processor-readable medium of claim 1, further comprising code to:
    detect an error in the predicted category indicator of the image, the predicted organic type indicator of the image, or the predicted bag type indicator of the image; and
    train the machine learning model at least based on the image, the predicted category indicator of the image, the predicted organic type indicator of the image, or the predicted bag type indicator of the image.

7. The non-transitory processor-readable medium of claim 1, further comprising code to:
    execute an image recognition model to read an indication of weight from the image and generate a representation of weight, and
    calculate, after training the machine learning model such that the machine learning model is executed, an adjusted weight based on the representation of weight and the predicted bag type indicator of the image.

8. The non-transitory processor-readable medium of claim 7, further comprising code to:
    calculate a price based on the adjusted weight, the predicted category indicator of the image, or the predicted organic type indicator of the image.

9. The non-transitory processor-readable medium of claim 1, further comprising code to:
    determine, after the training set is generated, a population density of the training set, the population density indicating a percentage value for each category represented in the plurality of category indicators, a percentage value for organic produce, a percentage value for inorganic produce, or a percentage value for each bag type represented in the plurality of category indicators.

10. The non-transitory processor-readable medium of claim 9, wherein the population density of each of the organic produce or non-bagged produce is at least 40%.

11. An apparatus comprising:
    a memory; and
    a processor operatively coupled to the memory, the processor configured to:
        generate a plurality of simulated images of produce based on a plurality of images of produce;
        associate each image of produce from the plurality of images of produce and each simulated image of produce from the plurality of simulated images of produce with a category indicator from a plurality of category indicators for that image, an organic type indicator from a plurality of organic type indicators for that image, and a bag type indicator from a plurality of bag type indicators for that image, to generate a training set; and
        train a machine leaning model using the training set such that when the machine learning model is executed, the machine learning model receives an image and generates a predicted category indicator for the image, a predicted organic type indicator for the image, and a predicted bag type indicator for the image.

12. The apparatus of claim 11, further comprising a camera configured to capture the plurality of images of produce.

13. The apparatus of claim 11, the processor further configured to:
    execute an image recognition model to read an indication of weight from the image and generate a representation of weight, and
    calculate, after training the machine learning model such that the machine learning model is executed, an adjusted weight based on the representation of weight and the predicted bag type indicator of the image.

14. A method comprising:
    generating, at a first compute device, a plurality of simulated images of produce based on a plurality of images of produce;

associating each image of produce from the plurality of images of produce and each simulated image of produce from the plurality of simulated images of produce with a category indicator from a plurality of category indicators, an organic type indicator from a plurality of organic type indicators, and a bag type indicator from a plurality of bag type indicators, to generate a training set;

training a machine leaning model using the training set to generate a trained machine learning model; and transmitting the trained machine learning model from the first compute device to a second compute device that is remote from the first compute device and that executes the trained machine learning model to generate a predicted category indicator of an image, a predicted organic type indicator of the image, and a predicted bag type indicator of the image, upon receipt of the image.

15. The method of claim 14, wherein the machine learning model is a first machine learning model, the method further comprising to perform at least one of:
 (a) executing a second machine learning model to generate a first plurality of simulated images from the plurality of simulated images, or
 (b) execute a procedural program to generate a second plurality of simulated images from the plurality of simulated images.

16. The method of claim 14, wherein the bag type indicator of the image and each image from the training set each includes at least a transparent bag indicator for that image, a net bag indicator for that image, a colored bag indicator for that image, a paper bag indicator for that image, or non-bagged indicator for that image.

17. The method of claim 14, wherein the machine learning model is a concurrent model including an output layer having a number of neurons Y including a first number of neurons N for the plurality of category indicators, a second number of neurons M for the plurality of bag type indicators, and a third number of neurons $\gamma$ for the plurality of organic type indicators.

18. The method of claim 17, wherein training the concurrent model includes:
 executing a loss function to calculate a loss value based on the category indicator of the image, the organic type indicator of the image, the bag type indicator of the image, the predicted category indicator of the image, the predicted organic type indicator of the image, or the predicted bag type indicator of the image,
 the loss function is a linear combination of a categorical cross-entropy calculated for the first number of neurons N and the second number of neurons M, and a binary cross-entropy for the third number of neurons $\gamma$.

19. The method of claim 14, further comprising:
 detecting an error in the predicted category indicator of the image, the predicted organic type indicator of the image, or the predicted bag type indicator of the image; and
 training, after training the machine leaning model using the training set, the machine learning model at least based on the image, the predicted category indicator of the image, the predicted organic type indicator of the image, or the predicted bag type indicator of the image.

20. The method of claim 14, further comprising:
 executing an image recognition model to read an indication of weight from the image and generate a representation of weight, and
 calculating, after training the machine learning model such that the machine learning model is executed, an adjusted weight based on the representation of weight and the predicted bag type indicator of the image.

* * * * *